Figure 1:
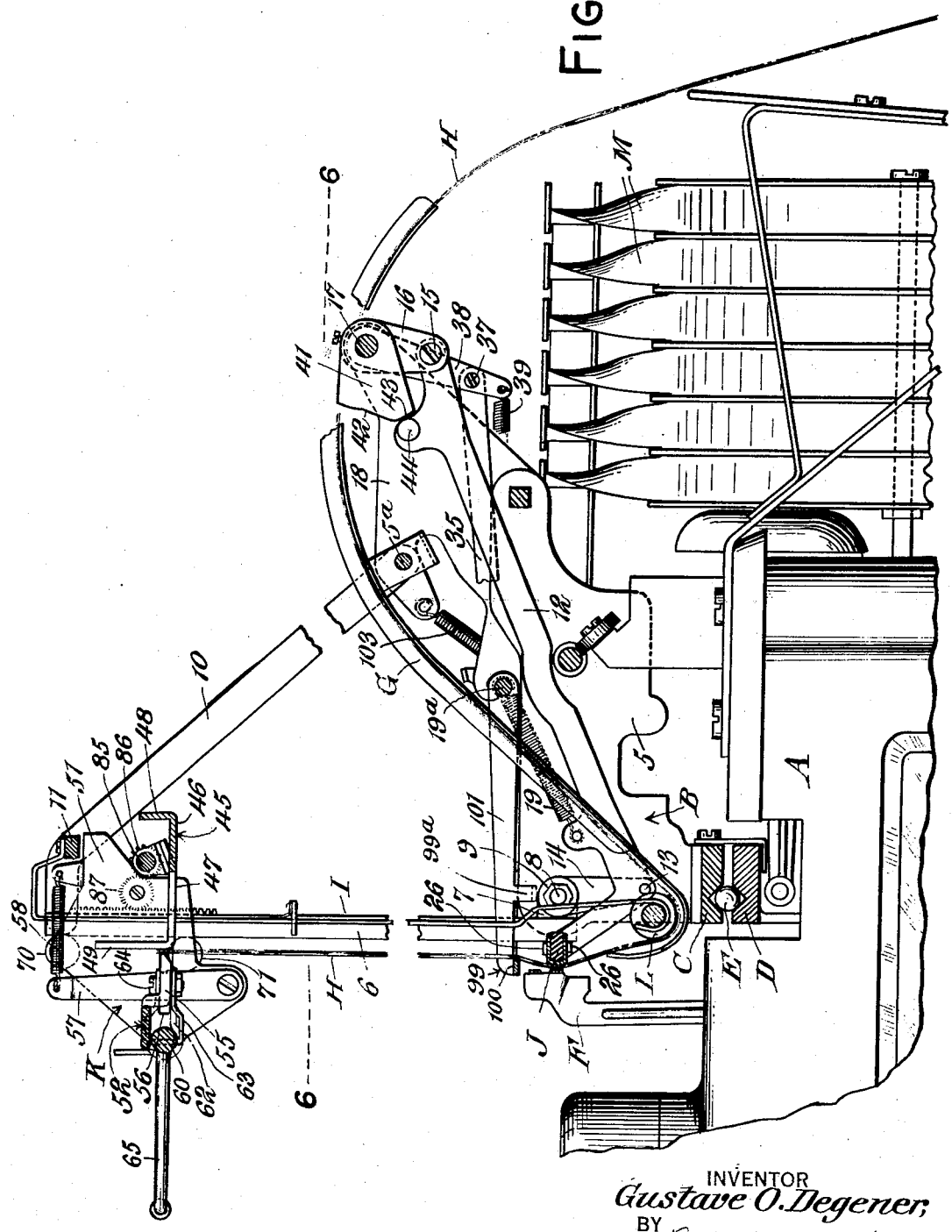

April 12, 1932.  G. O. DEGENER  1,853,669
MANIFOLDING DEVICE
Filed May 2, 1929   8 Sheets-Sheet 1

INVENTOR
Gustave O. Degener,
BY
Baldwin + Hight
ATTORNEYS.

April 12, 1932.   G. O. DEGENER   1,853,669
MANIFOLDING DEVICE
Filed May 2, 1929   8 Sheets-Sheet 2

INVENTOR
Gustave O. Degener,
BY
ATTORNEYS.

April 12, 1932.　　G. O. DEGENER　　1,853,669
MANIFOLDING DEVICE
Filed May 2, 1929　　8 Sheets-Sheet 3
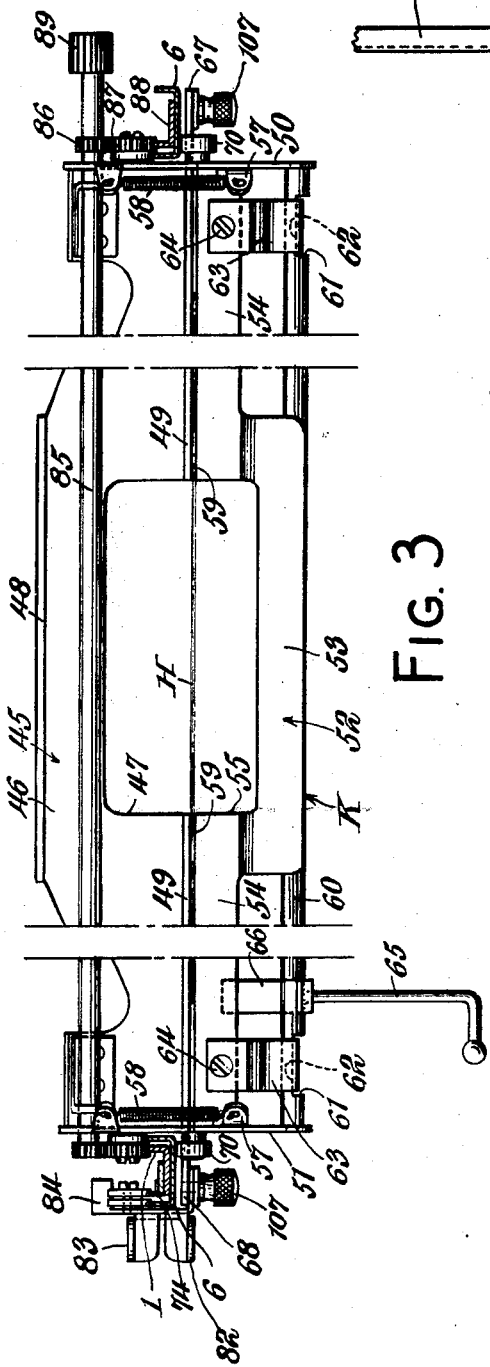
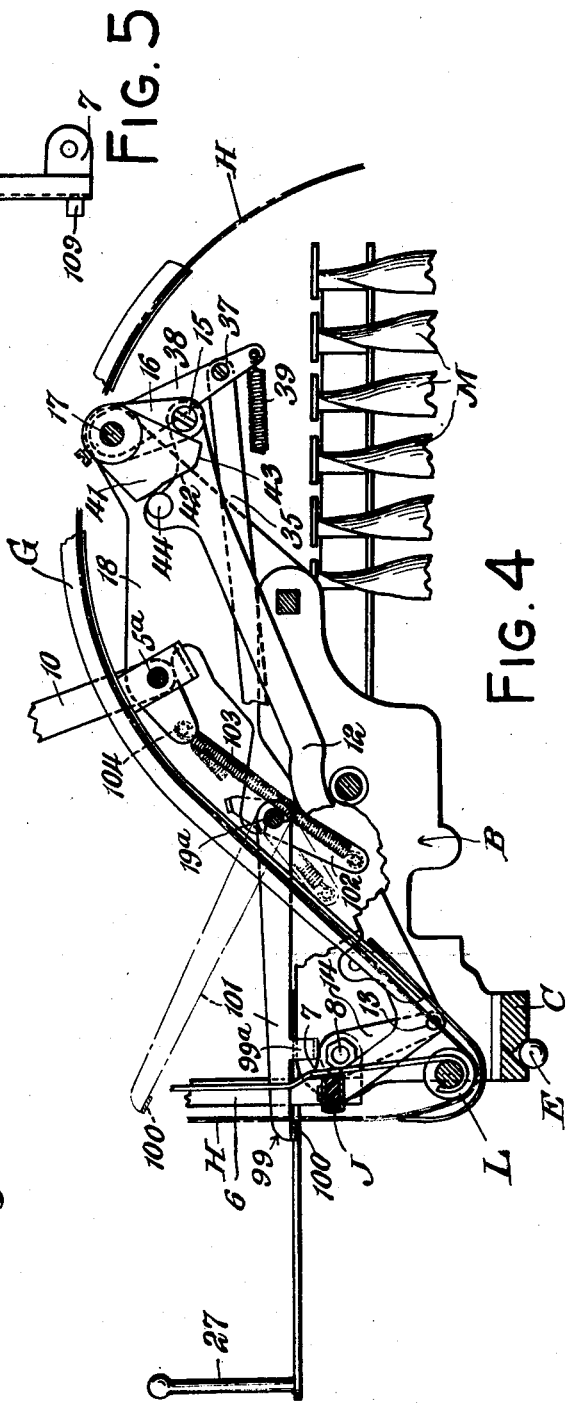
INVENTOR
*Gustave O. Degener,*
BY
*Baldwin + Wight*
ATTORNEYS.

April 12, 1932.  G. O. DEGENER  1,853,669
MANIFOLDING DEVICE
Filed May 2, 1929  8 Sheets-Sheet 4
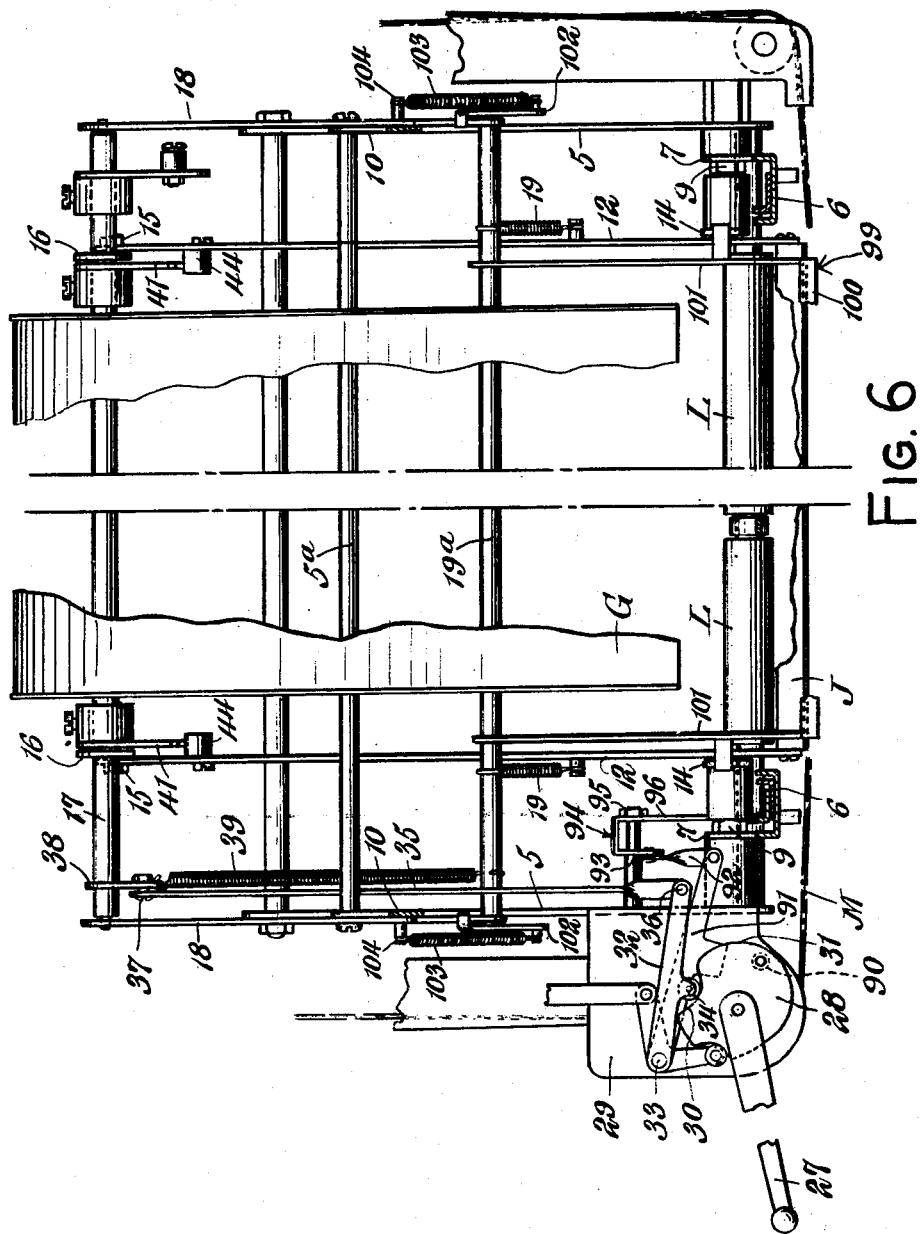

April 12, 1932.    G. O. DEGENER    1,853,669
MANIFOLDING DEVICE
Filed May 2, 1929    8 Sheets-Sheet 5
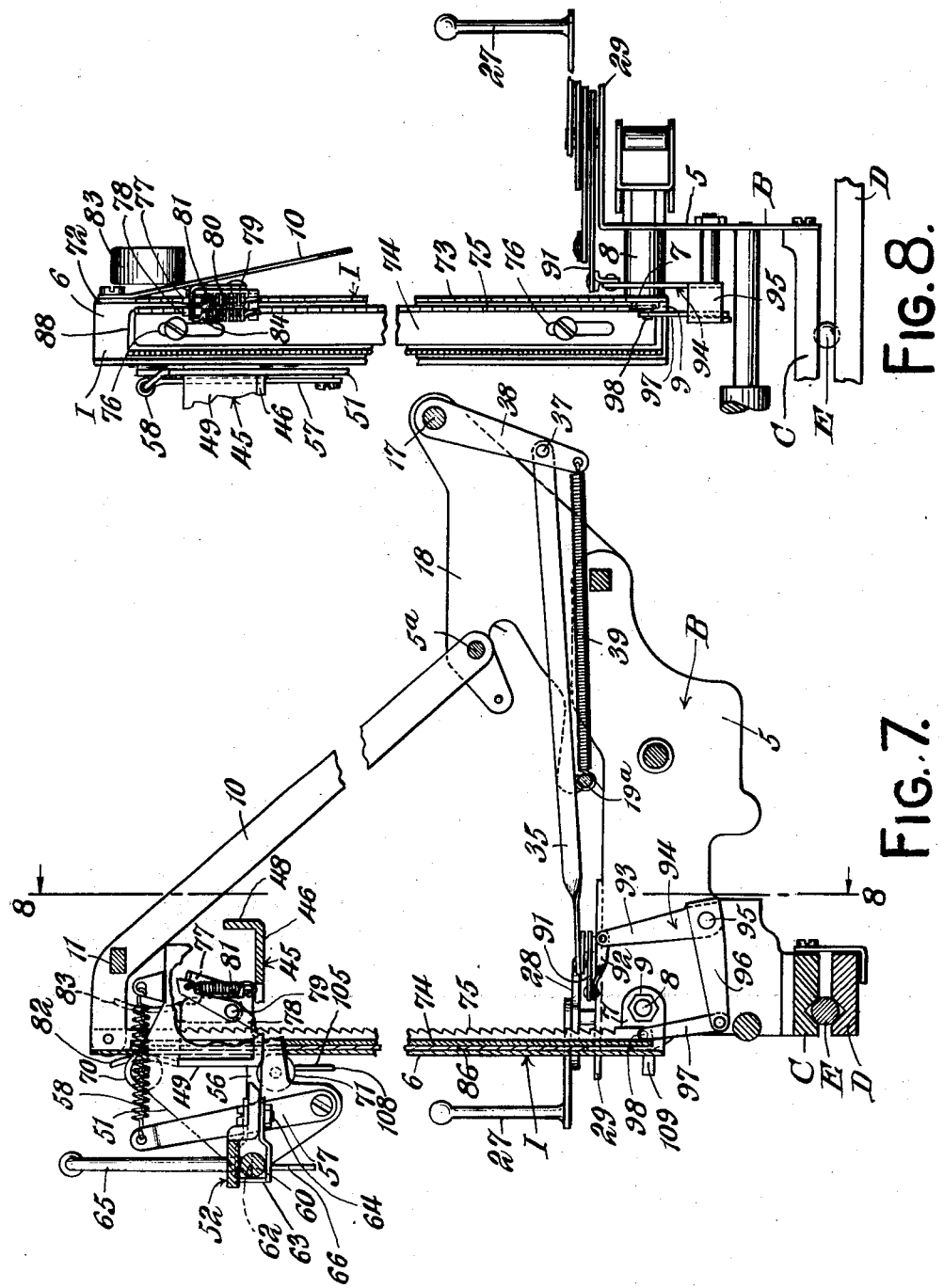
INVENTOR
Gustave O. Degener,
BY Baldwin & Wight
ATTORNEYS.

April 12, 1932.   G. O. DEGENER   1,853,669
MANIFOLDING DEVICE
Filed May 2, 1929   8 Sheets-Sheet 6
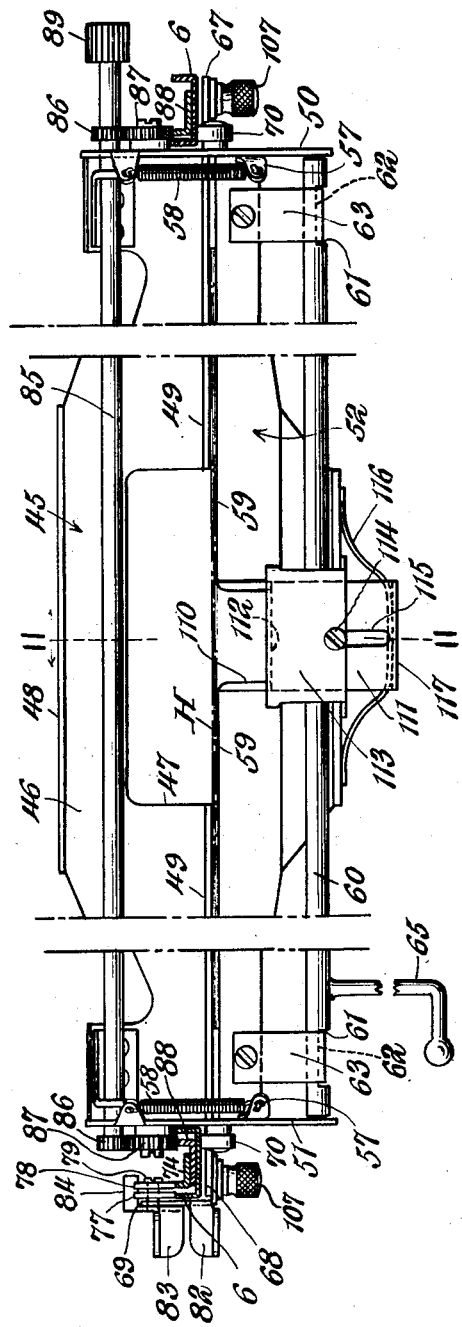
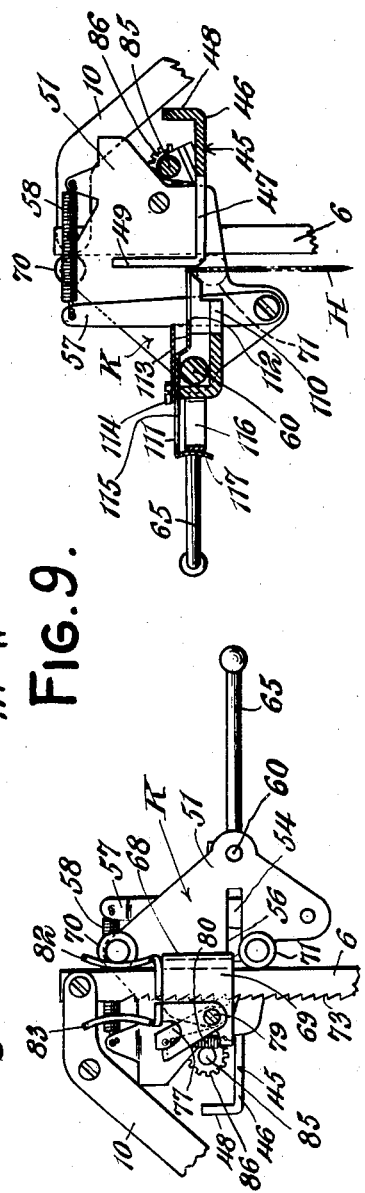
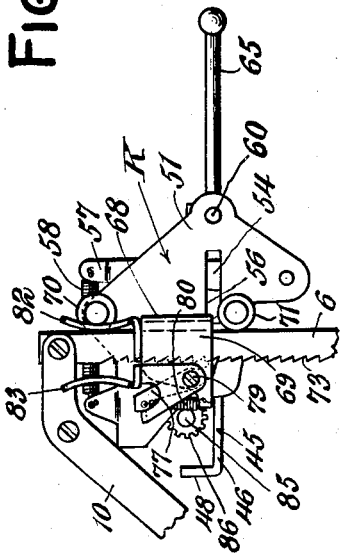
INVENTOR
Gustave O. Degener,
BY Baldwin & Wight
ATTORNEYS.

April 12, 1932.  G. O. DEGENER  1,853,669
MANIFOLDING DEVICE
Filed May 2, 1929  8 Sheets-Sheet 7
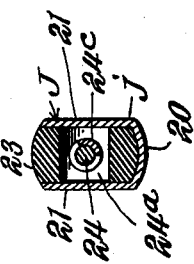
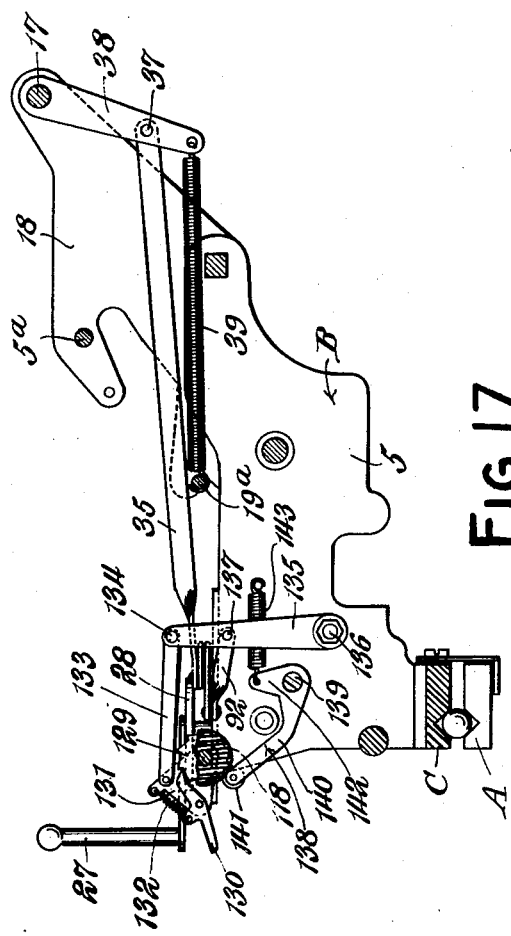
INVENTOR,
Gustave O. Degener,
BY Baldwin + Wight
ATTORNEYS.

April 12, 1932.  G. O. DEGENER  1,853,669
MANIFOLDING DEVICE
Filed May 2, 1929   8 Sheets-Sheet 8

INVENTOR,
Gustave O. Degener,
BY Baldwin + Hight
ATTORNEYS.

Patented Apr. 12, 1932

1,853,669

UNITED STATES PATENT OFFICE

GUSTAVE O. DEGENER, OF BROOKLYN, NEW YORK, ASSIGNOR TO ROYAL TYPEWRITER COMPANY, INC., OF NEW YORK, N. Y., A CORPORATION OF NEW YORK

MANIFOLDING DEVICE

Application filed May 2, 1929. Serial No. 359,934.

This invention relates to new and useful improvements in manifolding devices which may be readily attached to any standard typewriting machine without changing such machine in any material respect, and embodies certain improvements over the inventions disclosed in my co-pending application Serial No. 133,437, filed Sept. 3, 1926, and in the divisional application thereof Serial No. 194,135, filed May 25, 1927.

The present invention, and likewise the inventions of the co-pending applications above noted, is designed for the purpose of writing on continuous billing forms or work sheets which are frequently in lengths of several hundred feet. Means are provided for guiding these forms upwardly past a platen to a truck which is mounted on a frame for vertical movements, and means are provided for effecting spacing movements of the truck and thereby line space the forms. In the co-pending applications above noted, the platen is fixed to the frame and the latter is movably supported whereby upon movement of the frame, the platen will be bodily moved to relieve the tight contact relation between the work sheets and the platen prior to the line spacing operation.

In the present invention, I have provided a fixed frame and a movable platen, and have provided means for bodily moving the platen relative to the frame to relieve the tight contact relation between the work sheets and platen and to effect the line spacing operation in sequence.

My invention also includes a reversible and non-rotary platen whereby either a hard or soft surface may be presented to the work sheets, depending upon the number of copies of work sheets desired to be printed.

A further object of this invention lies in the truck being provided with relatively fixed and movable clamping plates which are conjointly formed with an opening through which the work sheets extend and by means of which the operator may readily grasp the work sheets when it is desired to return the truck to its lowermost or initial position.

Figure 2:
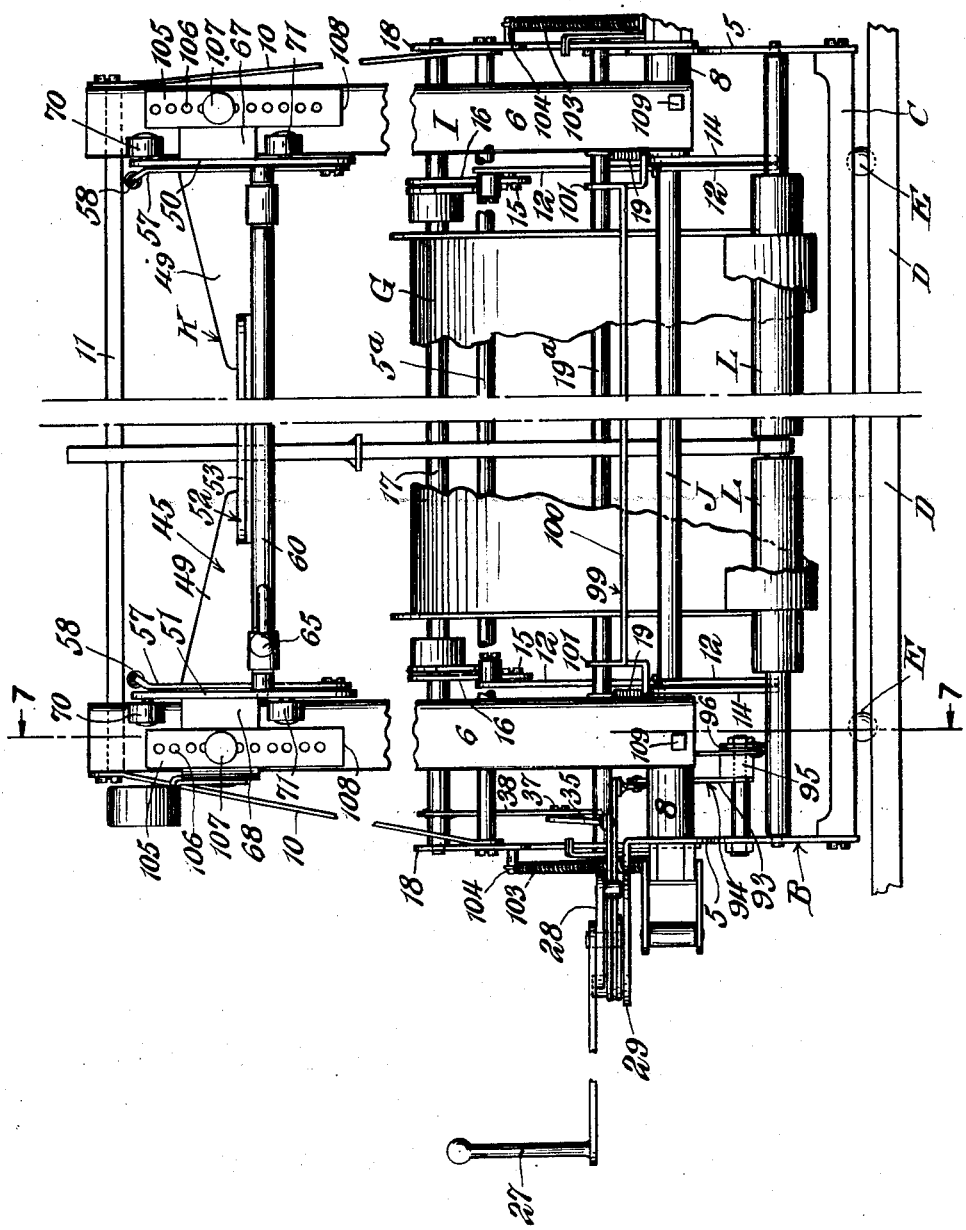

In the accompanying drawings:

Figure 1 is a fragmentary side elevational view of a typewriter showing the carriage and the manifolding device, which forms the subject matter of my invention, mounted thereon, Figure 2 is a front elevation of the carriage and manifolding device, Figure 3 is a top plan view of the paper truck, the view showing the relation between the truck and the supporting frame therefor, Figure 4 is a vertical sectional view through the manifolding device showing the platen in position after it has been moved rearwardly away from the work sheets, Figure 5 is a detail side elevation showing the lower portion of the frame upright and stop for limiting the downward movement of the truck, Figure 6 is a horizontal sectional view of the device taken on the line 6—6 of Figure 1, Figure 7 is a vertical sectional view through the device taken on the line 7—7 of Figure 2, showing particularly the mechanism for feeding the truck.

Figure 16:
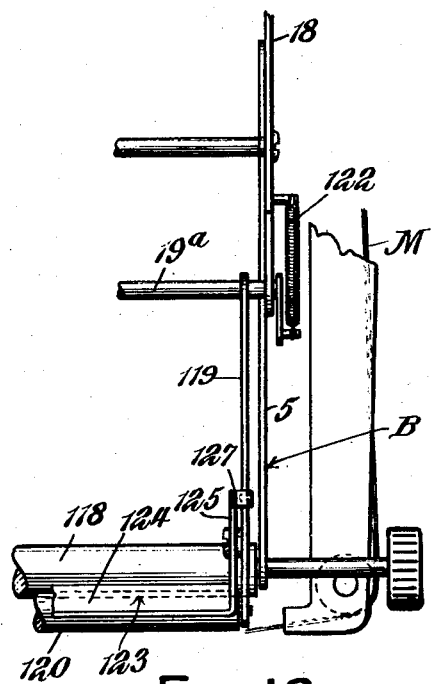
Figure 15:
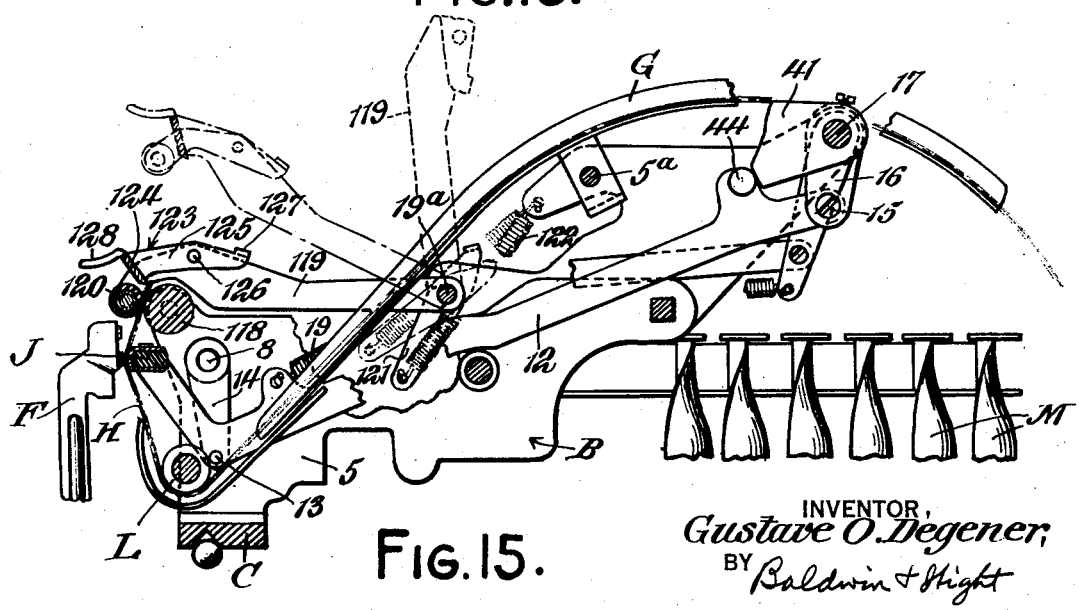

Figure 8 is a rear elevation taken on the line 8—8 of Figure 7,

Figure 9 is a view similar to Figure 3 but showing a movable paper truck of different form, Figure 10 is a left hand elevation of the truck and supporting structure, Figure 11 is a vertical sectional view taken on the line 11—11 of Figure 9, Figure 12 is a plan view of the reversible platen, Figure 12ª is a cross sectional view taken on the line 12ª, 12ª of Fig. 12, Figure 13 is a transverse sectional view taken on the line 13—13 of Figure 12, Figure 14 is an end elevation of the platen shown in Figure 12, Figure 15 is a vertical sectional view showing a modified construction of the device, Figure 16 is a detailed top plan view showing particularly the means for supporting the pressure roller employed in the modified construction, and Figure 17 is a vertical sectional view showing the line spacing mechanism employed in the modified construction shown in Figures 15 and 16.

As previously stated, the invention may be employed in various types of typewriting machines and there has accordingly been illustrated only enough of the usual typewriting machine to show the position of the mechanism accomplishing this invention with relation thereto.

The drawings illustrate a main frame A, a carriage B having a rail C adapted to travel on the main rail D mounted on the main frame, through the medium of ball bearings E. The typewriting machine includes type bars F. A paper table G is supported on the carriage and paper webs or work sheets H are fed thereover to the platen of the machine. Between the work sheets H are fed carbon strips M.

Referring particularly to the preferred construction shown in Figures 1 to 14 inclusive, the carriage B is provided with side plates 5, 5 and rigidly supported on the front ends of the side plates is a vertically disposed frame I. A platen J is supported on the side plates 5 of the carriage for bodily movement in a direction fore and aft of the machine and independently of the frame I. A truck K for the paper webs or work sheets H is mounted on the frame I and is adapted to be fed upwardly therealong. The work sheets H after passing over the table G pass under a guide roller L which is mounted on the carriage and thence upwardly in front of the platen J and have their lead-in ends connected to the truck K which is disposed above the platen. Normally the truck K is in its lowermost position, and means are provided for first bodily moving the platen rearwardly so as to relieve the tight contact relation between the platen and the work sheets and carbon strips, and for subsequently effecting a line spacing movement to the truck so as to feed the work sheets a predetermined distance, while the platen J is separated therefrom and while the work sheets and carbon strips are in separated or free relation.

The frame I comprises a pair of spaced upright frame members 6, 6 of channel shaped construction, the channels opening rearwardly of the machine. The lower ends of the upright frame members 6, 6 are respectively provided with rearwardly extending arms 7, 7 which are mounted on supporting studs 8, 8 extending laterally from the side plates 5, and clamped thereon by means of nuts 9, 9. In order to retain the frame members 6, 6 against swinging on their supports 8, 8, I have provided rearwardly and downwardly extending braces 10, 10 which are connected at their upper ends to the upper ends of the frame members 6 and at their lower ends to a cross rod 5ª which connects the side plates 5. A cross bar 11 connects the braces 10, 10 and serves to maintain the upright frame members 6, 6 in spaced parallel relation.

The type bar F swings upwardly between the upright members 6, 6 of the frame I for cooperation with the platen J. The platen is connected at its ends to rearwardly extending links or supports 12, 12, and the front ends of the links 12 are pivotally connected as at 13 to supporting links or hangers 14 which are in turn pivotally supported on the studs 8 which are mounted on the side plates 5 of the carriage.

The rear ends of the links 12 are pivotally connected as at 15 to rock arms 16 fixed to a transversely disposed rock shaft 17 journaled in the side plate extensions 18. Springs 19 are associated with the respective links 12 to yieldably retain the platen J in its rearmost position of movement, that is, in a position in which the platen is separated from the work sheets H, as shown in Figure 4. The forward end of each spring 19 is connected to the associated link 12 and the rear end of each spring is connected to a rock shaft 19ª. Thus when the platen is in its rearmost position, as shown in Figure 4, the work sheets H may be line spaced. This is particularly advantageous when making one or more copies of the original work sheet for the reason that by separating the platen from the work sheets at the time of the line spacing operation, the carbon strips which are interleaved with the work sheets will be freed and consequently the work sheets may be readily line spaced without dragging the carbon strips and without blurring the work sheets. The mechanism for feeding such carbon strips is fully described in my co-pending applications referred to above.

A removable platen J consists of an elongated member or casing j which is U-shaped in cross-section and is formed of metal or other hard substance. This casing includes a curved connecting portion 20 forming a printing surface, and spaced top and bottom walls 21, 21. The casing is filled with an insert 22 of rubber or other relatively soft material, the face thereof opposite the connecting portion 20 being correspondingly curved to form a printing surface. Thus I have provided a platen with oppositely disposed and relatively hard and soft printing surfaces. The platen J is connected to the supporting links 12 in a manner to permit the platen to be reversed so as to present either the hard face 20 or the soft face 23 to the type. This is advantageous as it permits of the hard surface 20 being employed when a large number of copies are desired to be printed or the soft surface 23 being employed when it is desired to print a small number of copies. A spring pressed fulcrum pin 24 extends from one end of the platen for engagement with the associated link 12 and a fulcrum pin 25 fixed to the other end of the platen engages an opening in the corresponding supporting link 12. Platen locating lugs 26, 26 on the link position the platen and cooperate therewith to lock the same against rotation.

At the opposite ends of the platen, the top and bottom walls 21, 21 are provided with overlapping ears 21ª, 21ª, and 21ᵇ, 21ᵇ. The pivot pin 24 is slidably mounted in alined openings found in the ears 21ª, and its inner end projects into a recess 24ª formed in the adjacent end of the insert 22. A shoulder 24ᵇ which is fixed to the pin at a point intermediate its ends, is normally held against the inner ear 21ª by a coil spring 24ᶜ which surrounds the inner end of the pin and bears at its ends against said shoulder and against the inner wall 24ᵈ of the recess. The inner end of the pin 24 is normally spaced from the inner wall 24ᵈ of the recess. The pin 25 is fixed to the ears 21ᵇ.

Thus, the above construction permits the ready removal or reversal of the platen by first pressing the pin 24 against the tension of the spring 24ª until said pin is freed from the link 12. After the platen has been freed from both links 12, the platen may be reversed and re-positioned so as to present its other printing face, either 20 or 23 as the case may be, to the type, the lugs 26 serving to retain the platen against rotation.

In order to move the platen J forwardly and engage the work sheets H, I have provided means for moving the platen J against the tension of the springs 19 and also means for locking the platen in its forward or printing position. To this end, a manually operable controlling lever 27 is fixed to a horizontally disposed cam 28 which is pivoted to rotate on a shelf 29 extending laterally from one of the said plates 5. The cam 28 is provided with a peripheral depression or eccentric portion 30 and with a concentric portion 31.

A lever 32 is pivoted as at 33 upon the shelf 29 and carries a cam roller 34 which engages the periphery of the cam 28. A link 35 is pivotally connected at one end as at 36 to the free end of the lever 32 and at its other end as at 37 to the lower end of a rock arm 38 fixed to the rock shaft 17. A spring 39 has its rear end connected to the rock arm 38 and its forward end to the rock shaft 19ª. The spring 39 normally urges the rock arm 38 forwardly and consequently the roller 34 is yieldably held in engagement with the periphery of the cam 28. Adjustably fixed to the rock shaft 17 are cams 41, 41 of identical construction. These cams extend forwardly of the rock shaft 17 and the forward end of each cam is formed with an eccentric portion 42 and a concentric portion 43, said portions merging into each other. The front edges of the cams 41 engage eccentric shoulders 44, 44 fixed to the respective links 12 and having sliding contact therewith. Thus when the control lever 27 is swung to the right as viewed in Figure 6, the eccentric portion 30 of the cam will engage the roller 34 and thereby swing the lever 32 rearwardly. This rearward movement of the lever 32 will move the link 35 rearwardly against the tension of the spring 39, and thereby rock the shaft 17 in an anti-clockwise direction. The platen J is in its normal Figure 1 position and the concentric portions 43 of the cams 41 are in engagement with the shoulders 44 to lock the platen in its printing position and against the tension of the springs 19. Thus when the control lever 27 is moved to the right as above described, the cams 41 will be swung downwardly thereby moving the concentric portions 43 of said cams out of engagement with the shoulders 44 and moving the eccentric portions 42 of said cams into engagement with said shoulders thereby permitting the springs 19 to automatically return the platen J to its rearmost or non-printing position, or to the position shown in Figure 4 wherein the platen is separated from the work sheets.

It will be observed that when the control lever 27 is returned to its normal position as shown in Figure 6, the cams 41 will be also returned to their normal positions as shown in Figure 1, thereby returning the platen J to its printing position and locking said platen against rearward movement.

I will now describe my improved truck K and the mechanism for effecting the line spacing movement thereof immediately following the platen J being separated from the work sheets. This truck operates in a vertical plane and is disposed between the uprights 6, 6 of the vertical frame I. The truck includes a horizontally disposed and relatively fixed clamping plate or bar 45 of channel shaped form which includes a horizontal web or connecting portion 46 having a forwardly and centrally disposed cutout portion 47, an upwardly extending flange 48 located along the rear edge of the web 46, spaced upwardly extending flanges 49, 49 which are arranged along the front edge of the web 46 on opposite sides of the cutout portion 47, and right and left end walls 50 and 51.

Disposed in front of the relatively fixed clamping plate 45 is a horizontally disposed and relatively movable clamping plate 52 which is normally spring pressed toward the relatively fixed clamping plate 45 so as to clamp the work sheets H therebetween. The movable clamping plate 52, as shown in Figure 3, includes a central portion 53 and alined end portions 54, 54 which are offset from the central portion 53 to provide a resultant recess or cutaway portion 55 which registers with the recess or cutaway portion 47 of the fixed clamping plate 45. The end portions 54, 54 of the movable clamping plate are mounted to slide in horizontally disposed slots 56 formed in the associated end walls 50 and 51 respectively, one of said slots being shown in Figures 7 and 10. Pivoted on the respective ends walls 50 and 51 are levers 57, and associated with each lever is a coil spring 58 having one end connected to the lever and its other end connected to the associated end plate for normally urging said lever rearwardly. The levers 57 press against the front edges of the movable clamping plate 52, and consequently the clamping edges 59, 59 of said movable clamping plate are yieldably retained by the springs 58 in engagement with the front flanges 49, 49 of the relatively fixed clamping plate 45.

Thus it will be observed that the recess 47 of the relatively fixed plate and the recess 55 of the relatively movable plate are respectively disposed on opposite sides of the work sheets H, and that said recesses conjointly form an enlarged opening into which the hand of the operator may be positioned to take hold of the work sheets and retain the latter while the truck is being moved downwardly from its upper extreme position to its lower extreme position.

During this downward movement of the truck, it is, of course, desirable to move the movable clamping plate 52 forwardly so as to separate said plate from the relatively fixed clamping plate 45 whereby the truck will be freed from the work sheets during the downward movement of said truck. To this end, I have provided the following means:

A rock shaft 60 extends directly over the central portion 53 of the movable clamping plate 52, and the ends of this rock shaft are respectively journaled in the end walls 50 and 51 of the fixed clamping plate 45. The shaft 60 adjacent each end is cut away to form a recess 61 to provide a resultant cam surface 62. Straps 63, 63 are respectively attached to the end portions 54, 54 of the movable clamping plate 52 through the medium of screws 64, 64. These straps extend forwardly into the recesses 61 and engage the cam surfaces 62 whereby upon oscillation of the shaft 60 in one direction the movable clamping plate 52 will be moved forwardly against the tensions of the springs 58 so as to separate said movable clamping plate from the work sheets H. Normally the cam surfaces 62 are disposed in a vertical plane, as shown in Figure 1, and consequently when the shaft is rotated in a clockwise direction the periphery of the shaft will engage the straps 63 and thereby move the movable clamping plate 52 outwardly in which position the movable plate will be retained until the rock shaft is oscillated in the opposite direction at which time the springs 58 will function to return said movable plate 52 to its initial clamping position. In order to provide means for rocking this shaft 60, I have connected a manually operable lever 65 to one end thereof. This lever is provided with an extension 66 which engages under the adjacent end portion 54 of the movable clamping plate so as to limit the downward movement of said lever. This lever 65 in its normal clamping position is disposed in a horizontal plane with the extension 66 thereof engaging under the end portion 54, as shown in Figures 1 and 3. When, however, the rock shaft 60 is oscillated to move the movable clamping plate 52 forwardly in order to release the work sheets H, the lever 65 is moved upwardly to the position shown in Figure 7. The truck K, as previously stated, is supported on the upright frame members 6, 6 for vertical movements therealong.

For this purpose, I have provided the front flanges 49, 49 of the fixed clamping plate 45 with projecting end portions 67 and 68 which respectively project through openings formed in the end walls 50 and 51 and are disposed in front of the upright frame members 6, 6. The extension 68 is provided at its end with a rearwardly extending ear 69 which is disposed against the left hand side of the left hand frame member 6. In order to reduce friction to a minimum, I have provided the truck K with opposite sets of upper and lower antifriction rollers 70 and 71, said rollers being journaled on the end walls 50 and 51 and contact with the front faces of the uprights 6. The left hand upright frame member 6 is of channel formation as previously described, and the left hand flange 72 thereof is provided with a series of ratchet teeth 73. Mounted within said left hand frame member 6 is a ratchet plate 74 having a flange extending rearwardly along one edge thereof and provided with ratchet teeth 75. The ratchet plate 74 is supported for vertical adjustments within the frame member 6 through the medium of upper and lower screw and slot connections, each being indicated as a whole by the numeral 76. The ratchet teeth 73 and 75 are positioned in staggered relation and associated with the respective teeth are pawls 77 and 78 which are mounted upon a common fulcrum pin 79 carried by the ear 69 of the truck. These pawls 77 and 78 are yieldably held in engagement with the respective ratchet teeth 73 and 75 through the medium of independent coil springs 80 and 81. These pawls 77 and 78 cooperate to retain the truck in position on the supporting frame I during the step by step line spacing operation.

In order to release both pawls 77 and 78 simultaneously to permit the truck to be lowered, I have provided a stationary finger piece 82 and a movable finger piece 83, the former being fixed to the ear 69 and the latter being pivoted to the pivot 79 of the pawls. The movable finger piece is provided with a laterally extending finger 84 which is disposed in rear of both pawls 77 and 78. As a result when the movable finger piece 83 is swung forwardly, the finger 84 will engage both pawls above the pivot 79 and swing their lower ends rearwardly to disconnect the same from the ratchet teeth 73 and 75, this movement being made against the tensions of the pawl springs 80 and 81. After the truck has been lowered, the operator releases the movable finger piece 83 and the pawl springs by reason of the pawls contacting with the finger 84, returns the finger piece 83 to its initial position and also returns the pawls into locking positions with the respective ratchet teeth 73 and 75.

It is desirable to avoid any binding action between the truck K and the supporting frame I, and to this end I have provided a horizontally disposed shaft 85 arranged directly above the relatively fixed clamping plate 45 and in rear of the recess 47 thereof. The ends of the shaft 85 are journaled in bearings mounted on the fixed clamping member 45 and extend beyond the walls 50 and 51 thereof. Fixed to the respective projecting ends of the shaft 85 are pinions 86, 86 which are in mesh with idle gears 87, 87 journaled on the end walls 50 and 51. The idle gears 87, 87 mesh with the teeth of racks 88, 88 which are respectively mounted within the upright frame members 6, 6. These racks 88 are fixedly held to the frame members 6 by means of the screws 76. One end of the shaft 85 extends beyond the associated pinion 86 and is provided with a hand wheel 89 by means of which the truck may be moved upwardly or downwardly independently of the line space mechanism.

In order to effect a line spacing operation of the truck K subsequent to the platen J being moved rearwardly to a position where it is relieved of its tight contact relation with the work sheets H, I have provided the cam 28 with a roller 90 which is journaled on a vertical axis carried by the cam and is located preferably below the lower face thereof. This roller 90 is disposed in spaced relation to the eccentric portion 30 and upon rotation of said cam, the roller is adapted to engage a lever 91 which is fulcrumed on the pivot 33 and has its free end pivotally connected to one end of a link 92. The other end of the link 92 is pivotally connected to the upper end of a vertical arm 93 of a bell crank lever 94 which is fulcrumed at its angle as at 95 to the carriage B. The other or horizontal arm 96 of said bell crank lever extends forwardly and is pivotally connected at its end to the upwardly extending link 97, the upper end of said link 97 being pivotally connected as at 98 to the lower end of the left hand ratchet plate 74.

The forward end of the paper guide G extends under the roller L which is disposed below the platen J. A guide 99 for the work sheets H is disposed above the platen J. This guide 99 consists of a bar 100 which extends in a horizontal plane in front of the work sheets and at a point directly above the platen. The ends of the bar 100 are provided with rearwardly extending arms 101, 101 which are fixed to the rock shaft 19ª. The ends of the rock shaft 19ª extend beyond the side plates 5 of the carriage and fixed to each projecting end of said rock shaft is a downwardly extending arm 102. A coil spring 103 has its lower end connected to the lower end of the arm 102 and its upper end connected as at 104 to the end plate 5 at a point above and in rear of the rock shaft 19ª. When the bar 100 is in its normal position as shown in Figure 3, a downwardly extending stop 99ª which is carried by one of the arms 101 contacts with the rearwardly extending arm 7 of the frame I and thereby limits the downward movement of said bar 100. In this normal position of the bar 100, the spring 103 extends in a plane at one side of the rock shaft 19ª and therefore said spring yieldably retains said bar in its normal position. When, however, the bar is raised so as to permit the easy threading of the work sheets H, the spring 103 will be moved across the longitudinal axis of the rock shaft 19ª to the position shown by dotted lines in Figure 4 and in this position the bar 100 will be held in its inoperative position.

When the bar 100 is in its normal position immediately above the platen J, it will be apparent that said bar and the roller L form two spaced points with which the work sheets contact and between which points the platen J is moved forwardly to bring about a proper co-relation between the work sheets and the platen whenever it is desired to print.

In order to provide means for variably limiting the lowermost position of the truck K, I have provided two vertically disposed plates 105, 105, each being provided with a vertical series of spaced openings 106. The plates 105 are secured to the respective projecting portions 67 and 68 of the truck by means of screws 107 which pass through selective openings 106 in said plates. By means of the openings 106 and the screws 107, each plate may be vertically adjusted relatively to the truck K. These plates are adjusted so that the lower ends 108 thereof are in the same horizontal plane below the truck and are respectively adapted to engage forwardly extending stop pins 109 fixed to the frame members 6 adjacent the lower edges thereof.

In the form of the truck K previously described in detail and shown in Figures 1 to 8 inclusive, the combined opening formed by the recesses 47 and 55 is of a size to permit the ready insertion of the operator's fingers for engaging the work sheets H for holding the lead-in ends of said work sheets while the truck is being lowered. After the truck has been lowered, which is done subsequently to the work sheets being printed, the lead-in ends are torn off by the operator, the tear being along the knife edges 59, 59 of the movable truck 52. In this form of truck, the recess 55 between the knife edges 59, 59 is of considerable width, and certain kinds of paper during the tearing operation above described, will not be torn straight across the webs due to the wide space or recess 55. I have, therefore, provided a movable knife which will close the centrally disposed recess in the movable clamping plate whereby the lead-in ends of the work sheets will be torn along a straight line from one edge to the other. Such a construction is illustrated particularly in Figures 9 and 11. In these figures the movable clamping plate 52 is provided with a comparatively narrow recess 110 and a knife 111 is supported for sliding movements on the movable clamping plate at points adjacent the recess 110. This knife 111 is in the nature of a thin flat plate having a cutting edge 112 adapted to be alined with the cutting edges 59, 59 of the movable clamping plate. A cover plate 113 is mounted above the knife 111 and cooperates with the plate to form a guide for the knife. This cover plate is held to the movable clamping plate through the medium of a clamping screw 114, the screw passing through an elongated slot 115 formed in the knife whereby the knife will be moved from its normally inoperative position as shown in Figure 9 to a point rearwardly thereof whereby the cutting edge 112 will aline with the cutting edges 59, 59. The knife 111 is normally held in its retracted or inoperative position, as shown in Figure 9, through the medium of a flat spring 116, the spring bearing against a thumb piece 117 which extends downwardly from the front edge of the knife 111. When it is desirable to tear off the lead-in ends of the work sheets H, the operator presses on the thumb piece 117 and pushes the knife 111 rearwardly so as to fill the recess 110 and position the cutting edge 112 of said knife in alinement with the cutting edges 59, 59 of the movable clamping plate. While the operator holds the knife 111 in this position, the lead-in ends of the work sheets H are torn off in a straight line from one side to the other.

In the operation of my invention, assuming the truck K to be located at the lower end of its movement and the work sheets H threaded over the guide G, under the roller L, in front of the platen J, in rear of the guide bar 100 and having their lead-in ends secured between the fixed plate 45 and the movable plate 52 of the truck K, the operator proceeds to print a line on the work sheets. Upon the completion of a given line, the operator swings the manually operable lever 47 to the right as viewed in Figure 6. The eccentric portion 30 of the cam 28 will through the roller 34 swing the lever 32. The lever 32 through the medium of the link 35 will rock the shaft 17 against the tension of the spring 39. This movement of the rock shaft 17 is in an anti-clockwise direction and consequently the cams 41 will be swung downwardly thereby permitting the links 12 to be moved rearwardly through the medium of the coil springs 19. This rearward movement of the links 12 bodily moves the platen J rearwardly to relieve its tight contact engagement with the work sheets H. This separation of the platen J from the work sheets preparatory to line spacing said work sheets, is very important in that it also releases the carbon strips M from the work sheets, thus permitting the work sheets to be line spaced without being dragged across the platen and without being smudged by the carbon strips. Upon further movement of the lever 27 in the same direction toward the right, the roller 90 will engage the lever 91 and thereby rock the bell crank lever 94 thereby moving the rack plate 74 upwardly a distance sufficient to effect a line space movement to the truck. The operating lever 27 is then returned to its initial position and the operation again repeated immediately following the printing of the next line on the work sheets.

The above described mechanism as shown in Figures 1 to 11, is especially adapted for use when continuous interfolded work sheets are employed and where the work sheets are ruled, or perforated so that the printed matter on the various copies will always register.

However, sometimes the outer sheet only is ruled, there is no printed matter whatever on the copies and the forms or sheets are not perforated, and consequently the above described construction is not particularly adapted for use with such work sheets. I have, therefore provided a construction especially adapted for work sheets of this type, such construction being illustrated in Figures 15, 16 and 17. In this modification the forms subsequent to the writing operations, are pulled up to a printed mark on the forms and the sheets are then torn off along the knife which is disposed directly above the platen. The work sheets are fed upwardly by a line space mechanism which actuates a pair of feed rolls, and the truck K of the first form is not employed.

Referring specifically to this modification as shown in Figures 15, 16 and 17, a line spacing feed roller 118 is suitably journaled in the side plates 5, 5 at a point directly above the platen J. A pair of arms 119, similar to the arms 101, are fixed to the rock shaft 19ª, and supported on the forward ends of these arms is an idle metal feed roller 120 which is disposed immediately in front of the rubber feed roller 118 for cooperation therewith to feed the work sheets H. Also fixed to each end of the rock shaft 19ᵃ is an arm 121 similar to the arm 102, and a spring 122 similar to the spring 103 is connected at one end to the arm 121 and at its other end to the side plate 5 of the machine. A knife 123 is mounted on the arm 119 and includes a cutter blade 124 which is disposed directly above the feed rollers 118 and 120. The blade 124 is provided at its ends with rearwardly extending arms 125 which are pivoted intermediate their ends as at 126 to the arms 119. The rear ends of the arm 125 are provided with laterally extending stops 127 for engaging the upper edges of the arms 119 to thereby limit the upward swinging movement of the blade 124. The knife 123 is pivoted so that the cutting edge of the blade 124 is adapted to cooperate with the feed roller 118 when it is desired to tear off the lead-in ends of the work sheets. A finger piece 128 extends forwardly from the knife 123 and is employed whenever it is desired to swing the knife and the arms 119 upwardly against the tensions of the springs 122 to the dotted line position shown in Figure 15. In this position the spring 122, having been moved against the axis of the rock shaft 19ᵃ, will hold the arms 119 in their inoperative position so as to permit the operator to withdraw his hand therefrom whenever it is desired to thread the lead-in ends of the work sheets between the feed rollers.

In order to impart a line spacing movement to the feed roller 118 and thereby feed the work sheets H after the platen J has been moved rearwardly out of contact therewith, I have provided a ratchet wheel 129 on the left hand end of the feed roller 118. A pawl 130 is pivotally mounted on an arm or housing 131 which is fulcrumed on the axis of the feed roller 118. A spring 132 is connected to the pawl and to the housing or arm 131 for yieldably urging said pawl into engagement with the teeth on the ratchet wheel 129. A rearwardly extending link 133 is pivotally connected at its forward end to the arm or housing 131 and the rear end of this link is pivotally connected as at 134 to the upper end of a vertically extending arm 135 which is fulcrumed as at 136 to the adjacent side plate 5 of the machine frame. The link 92 is pivotally connected as at 137 to the arm 135. Consequently when the manually operable lever 27 is moved to the right, the platen J will be first moved rearwardly as previously described, and during the latter part of the movement of said lever 27 to the right, the link 92 will swing the arm 135 rearwardly. This rearward movement of the arm 135 through the link 133 will swing the arm or housing 131 and thereby bodily move the pawl 130 to impart a feeding motion to the feed roller 118 and thereby feed the work sheets H a distance equal to the required line space.

A spring pressed retaining device is employed to retain the feed roller 118 against overthrow. This device comprises a lever 138 fulcrumed at its angle as at 139 to the adjacent side plate 5. One arm 140 is provided at its end with a roller 141 which rides on the teeth of the ratchet wheel 129. The other arm 142 is connected to one end of a coil spring 143, the other end of the spring being fixed to the associated side plate 5. Thus the roller 141 is spring held in engagement with the ratchet teeth of the ratchet wheel 129 and overthrow of said roller 118 is thereby prevented.

From the foregoing, it will be observed that I have provided a frame member over which the work sheets travel after leaving the platen member, in combination with means for bodily moving one of said members relatively to the other for relieving the tight contact relation between the work sheets and the platen member; that I have provided a single manually operable lever for first moving one of said members relatively to the other and for subsequently effecting a line spacing operation of the work sheets while said members are thus separated; that I have provided a truck embodying relatively fixed and movable clamping plates which are conjointly formed with an opening through which the work sheets extend and by means of which the operator may readily grasp the ends of the work sheets and retain the latter while the truck is being moved downwardly to its initial position; that I have provided a means on one side of the supporting frame for line spacing the truck and have provided means for preventing any binding action between the truck and the support during the line spacing movement of the truck; that I have provided guiding means for the work sheets arranged above and below the platen, in combination with means for positively moving the platen forwardly so as to curve the work sheets against the curved printing surface of the platen and have provided yieldable means for moving the platen rearwardly away from the work sheets whereby the latter are relieved of the curve therein during the subsequent line spacing operation of said work sheets, and that I have provided a reversible platen having a relatively hard surface and a relatively soft surface either of which may be employed depending upon the characteristics of the work sheets and the number of copies printed.

I claim:

1. In a manifolding device, a platen member over which the work sheets are fed, a frame member over which the work sheets travel after leaving the platen member, a line spacing mechanism for the work sheets mounted on said frame, and means for moving one member relative to the other member for effecting the separation of the work sheets and the platen member and for simultaneously operating the line spacing mechanism.

2. In a manifolding device, a platen member over which the work sheets are fed, a frame member over which the work sheets travel after leaving the platen member, a line spacing mechanism for the work sheets mounted on said frame, and means including a single manually operable lever for moving one member relative to the other member for effecting the separation of the work sheets and the platen member and for simultaneously operating the line spacing mechanism.

3. In a manifolding device, a non-rotating platen over which the work sheets are fed and formed with relatively hard and soft printing surfaces, means for supporting said platen whereby the latter may be reversed to present either the hard surface or the soft surface to the work sheets, a line spacing mechanism for the work sheets, and means for first moving the platen away from the work sheets and for subsequently effecting a line spacing operation.

4. In a manifolding device, a platen over which the work sheets are fed, a frame over which the work sheets travel after leaving the platen, a truck for the lead in ends of the work sheets mounted on said frame, means for line spacing the truck along the frame, and means for disconnecting the line spacing means from the truck, said truck including relatively fixed and movable clamping plates respectively having registering recesses on opposite sides of the work sheets for receiving the operator's hand when holding the work sheets during the return movement of the truck.

5. In a manifolding device, a platen over which the work sheets are fed, a frame over which the work sheets travel after leaving the platen, a truck for the lead in ends of the work sheets mounted on said frame, means for line spacing the truck along the frame, and means for disconnecting the line spacing means from the truck, said truck including relatively fixed and movable clamping plates respectively having registering recesses on opposite sides of the work sheets for receiving the operator's hand when holding the work sheets during the return movement of the truck, the movable clamping plate having a knife edge extending along its rear edge.

6. In a manifolding device, a platen over which the work sheets are fed, a frame over which the work sheets travel after leaving the platen, a truck for the lead in ends of the work sheets mounted on said frame, means for line spacing the truck along the frame, and means for disconnecting the line spacing means from the truck, said truck including relatively fixed and movable clamping plates, the relatively fixed clamping plate being provided with a centrally located recess and with flanges extending along the front edge of the plate on opposite sides of the recess, and spaced knife edges formed by the rear edge of the relatively movable clamping plate and cooperating with the spaced flanges of the fixed clamping plate.

7. In a manifolding device, a platen over which the work sheets are fed, a frame over which the work sheets travel after leaving the platen, a truck for the lead in ends of the work sheets mounted on said frame, means for line spacing the truck along the frame, means for disconnecting the line spacing means from the truck, said truck including relatively fixed and movable clamping plates respectively having registering recesses on opposite sides of the work sheets for receiving the operator's hand when holding the work sheets during the return movement of the truck, a movable filler plate slidably mounted on one of said clamping plates for filling the recess thereof, and yieldable means for normally retaining said filler plate in position to expose the recess.

8. In a manifolding device, the combination with a platen having a convexed printing surface over which work sheets are fed, of a guide for the work sheets disposed below the platen, a guide for the work sheets disposed above the platen in front of the work sheets, means for moving the platen forwardly to curve the work sheets against the platen surface during the printing operation, a line spacing mechanism for the work sheets, and means for first moving the platen rearwardly away from the work sheets and for subsequently actuating said line spacing mechanism to line space the work sheets while the platen is out of contact therewith.

9. In a manifolding device, the combination with a platen having a convexed printing surface over which work sheets are fed, of a guide for the work sheets disposed below the platen, a guide for the work sheets disposed above the platen in front of the work sheets and including a bar normally extending in front of the work sheets, pivoted arms for supporting said bar, means for limiting the swinging movement of the bar in one direction, and a spring for yieldably retaining said bar in its normal position, means for moving the platen forwardly to curve the work sheets against the platen surface during the printing operation, a line spacing mechanism for the work sheets, and means for first moving the platen rearwardly away from the work sheets and for subsequently actuating said line spacing mechanism to line space the work sheets while the platen is out of contact therewith.

10. In a manifolding device, the combination with a platen over which work sheets are fed, of a frame over which the work sheets are fed after leaving the platen, a truck for the lead in ends of the work sheets mounted on the frame for movements toward and from the platen, means for imparting line spacing movements to the truck in a direction away from the platen, and adjustable stop means for limiting the movement of the truck toward the platen, said stop means including a stop located on the frame adjacent the platen, and a vertically adjustable stop plate mounted on the truck for cooperation with said stop.

11. In a front strike typewriting machine, a platen, a paper guide below the platen, a paper holder above the platen, and a common means for moving the platen relative to the holder and guide and free of the paper and for actuating the paper holder to effect line spacing of said paper while the platen and paper are out of contact.

12. In a front strike typewriting machine, a platen, a rigid frame above the platen, a paper guide below the platen, paper holding means supported on the frame, and a common means for moving the platen away from the paper and for actuating the holder to effect line spacing of the paper.

13. In a front strike typewriting machine, a platen, a rigid frame above the platen, a paper guide below the platen, paper holding means supported on the frame, and a common means for moving the platen away from the paper and for thereafter actuating the holder to effect line spacing of the paper.

14. In a front strike typewriting machine, a platen, a rigid frame above the platen, a paper guide below the platen, paper holding means vertically movable on said frame and a common means for moving the platen away from the paper and for bodily moving the holder on the frame for the purpose described.

15. In a front strike typewriting machine, a platen, a rigid frame above the platen, a paper guide below the platen, paper holding means vertically movable on said frame and a common means for moving the platen away from the paper and for moving the holder vertically step-by-step to line space the paper while the platen is out of contact with said paper.

16. In a front strike typewriting machine, a platen, a rigid frame above the platen, a paper guide below the platen, a paper holding and line spacing device mounted on the frame and serving with the guide to dispose the paper substantially upright before the platen, and means for moving the platen out of contact with the paper and for thereafter actuating said line spacing device.

17. In a front strike typewriting machine, a platen, a paper holding and line spacing means above the platen, a guide below the platen, and a common means for moving the platen relatively to the guide and the holding and line spacing means to free the paper of platen contact and for actuating the line spacing means.

18. In a front strike typewriting machine, a platen, a rigid frame above the platen, a paper guide below the platen, paper holding means vertically movable between fixed limits on said frame, and a common means for moving the platen away from the paper and for bodily moving the holder on the frame for the purpose described, and means to vary said fixed limits.

19. In a front strike typewriting machine, a platen, a rigid frame above the platen, a paper guide below the platen, paper holding means vertically movable on said frame and a common means for moving the platen away from the paper and for moving the holder vertically step-by-step to line space the paper while the platen is out of contact therewith, and manually releasable means to secure the holding means in positions to which it is moved.

20. In a front strike typewriting machine, a platen, a paper guide below the platen, a paper holder above the platen, and a common means including a cam and means operated thereby for moving the platen relative to the holder and guide and free of the paper and for actuating the paper holder to effect line spacing of said paper while the platen and paper are out of contact.

21. In a front strike typewriting machine, a platen movable between paper contacting and non-contacting positions, a paper guide below the platen, paper holding means above the platen, a spring tending to hold the platen in one position, and a common means for moving the platen to its other position and for actuating the paper holding means to effect line spacing of the paper.

22. In a front strike typewriting machine, a platen movable between paper contacting and non-contacting positions, a paper guide below the platen, paper holding means above the platen, a spring tending to hold the platen in one position, and a common means for moving the platen to its other position and for actuating the paper holding means to effect line spacing of the paper, said last named means including cam faces coacting with said spring to position said platen in its paper contacting and non-contacting positions, and intermediate cam faces to control movement of the platen between said positions.

23. In a front strike typewriting machine, a platen, a paper guide below the platen, a paper holder above the platen, and a common means for moving the platen relative to the holder and guide and free of the paper and for actuating the paper holder to effect line spacing of said paper while the platen and paper are out of contact, said common means including an oscillatory cam, connections between said cam and paper holder for actuating the holder, and link and cam connections with the platen.

24. In a front strike typewriting machine, a platen, a paper guide below the platen, a paper holder above the platen, and a common means for moving the platen relative to the holder and guide and free of the paper and for actuating the paper holder to effect line spacing of said paper while the platen and paper are out of contact, said common means including an oscillatory cam, connections between said cam and paper holder for actuating the holder, link and cam connections with the platen, and spring means to hold said link and cam connections in contact.

25. In a manifolding device, a platen member, a frame over which the work sheets travel after leaving the platen member, a line spacing mechanism for the work sheets mounted on the frame, a guide below the platen and disposed relatively to the frame and the platen for positioning the work sheets uprightly before the platen member, and means for moving one member relatively to the other member and the guide to effect separation of the work sheets and the platen member and for concomitantly operating the line spacing mechanism.

26. In a manifolding device, a platen member, a frame over which the work sheets travel after leaving the platen member, a line spacing mechanism for the work sheets mounted on the frame, a guide below the platen and disposed relatively to the frame and the platen for positioning the work sheets uprightly before the platen member, and means including a single manually operable lever for moving one member relatively to the other member and the guide to effect separation of the work sheets and the platen member and for concomitantly operating the line spacing mechanism.

27. In a manifolding device, a guide under which work sheets are fed, a stationary frame disposed above the guide and along which the work sheets travel upwardly after leaving the guide, a non-rotatable platen disposed intermediate the guide and frame and in rear of the work sheets and normally pressing the work sheets and bowing the same forwardly, means for supporting the platen for bodily movements towards and from the work sheets, line spacing means mounted on the stationary frame, and means for moving the platen rearwardly and for simultaneously operating the line spacing means whereby the work sheets are relieved of their pressing engagement with the platen during the line spacing movement of the sheets.

28. In a manifolding device, a guide under which work sheets are fed, a stationary frame disposed above the guide and along which the work sheets travel upwardly after leaving the guide, a non-rotatable platen disposed intermediate the guide and frame and in rear of the work sheets and normally pressing the work sheets and bowing the same forwardly, means for supporting the platen for bodily movements towards and from the work sheets, line spacing means mounted on the stationary frame, a spring for yieldably retaining said platen in its extreme rearward position, a cam for moving said platen forwardly to its normal printing position against the tension of said spring and for temporarily retaining said platen in said normal position, and means including a single manually operable lever for operating the line spacing means and for simultaneously releasing the cam whereby the spring will bodily move the platen rearwardly to thereby relieve the work sheets from their pressing engagement with the platen during the line spacing movement of said sheets.

29. In a manifolding device, a guide under which work sheets are fed, a stationary frame disposed above the guide and along which the work sheets travel upwardly after leaving the guide, a non-rotatable platen disposed intermediate the guide and frame and in rear of the work sheets and normally pressing the work sheets and bowing the same forwardly, a pair of endwise movable arms supporting the platen, a pair of pivoted hangers for pivotally supporting each arm, a rock shaft extending transversely of said arms, cams fixed to said rock shaft and engaging said platen-supporting arms for normally retaining the platen in its normal position, a spring for yieldably retaining said arms in contact with said cams, and means for operating the line spacing means and for simultaneously oscillating the rock shaft to swing the cams whereby said spring will move the platen bodily rearwardly to relieve the pressing engagement between the platen and the work sheets during the line spacing movement of the latter.

In testimony whereof, I have hereunto subscribed my name.

GUSTAVE O. DEGENER.